United States Patent
Abe et al.

(10) Patent No.: US 7,284,637 B2
(45) Date of Patent: Oct. 23, 2007

(54) LOW-FREQUENCY SOUND REPRODUCING SPEAKER APPARATUS

(75) Inventors: Yasuhisa Abe, Yamagata (JP); Chuichi Endo, Yamagata (JP); Koji Nakane, Tokyo (JP); Yumi Takigami, Tokyo (JP)

(73) Assignees: Pioneer Corporation, Tokyo (JP); Tohoku Pioneer Corporation, Yamagata (JP); Pioneer Design Corporation, Tokyo (JP)

( * ) Notice: Subject to any disclaimer, the term of this patent is extended or adjusted under 35 U.S.C. 154(b) by 0 days.

(21) Appl. No.: 11/353,974

(22) Filed: Feb. 15, 2006

(65) Prior Publication Data

US 2006/0191740 A1   Aug. 31, 2006

(30) Foreign Application Priority Data

Feb. 15, 2005 (JP) ............................ 2005-037871
Apr. 27, 2005 (JP) ............................ 2005-130529

(51) Int. Cl.
*H05K 5/06* (2006.01)
*H04R 1/28* (2006.01)
*H04R 1/02* (2006.01)

(52) U.S. Cl. .................... 181/156; 181/199; 381/86; 381/349; 381/389; 224/275

(58) Field of Classification Search ................ 181/156, 181/153, 148, 199; 296/1.09, 24.34; D12/421; 381/86, 334, 336, 345, 349, 389; 224/275, 224/929
See application file for complete search history.

(56) References Cited

U.S. PATENT DOCUMENTS 3,136,461 A * 6/1964 Gregg, Jr. .................... 224/540
3,873,010 A * 3/1975 Patterson .................... 224/275

(Continued)

FOREIGN PATENT DOCUMENTS

DE   38 08 748 A1   9/1989

(Continued)

OTHER PUBLICATIONS

Japanese Abstract No. 2004330951, dated Nov. 25, 2004.

*Primary Examiner*—Edgardo San Martin
(74) *Attorney, Agent, or Firm*—Sughrue Mion, PLLC

(57) ABSTRACT

In a low-frequency sound reproducing speaker apparatus of Kelton type, a cabinet for containing a speaker unit is constituted by a shape of substantially a parallelepiped slender in a front and rear direction, a length dimension in the front and rear direction is set to a value substantially near to a depth dimension of a seat cushion of a vehicle, the speaker unit is attached to a partition plate for partitioning inside of the cabinet into front and rear air chambers, and a lower face of the cabinet is fixed to the seat cushion by a fixing belt laid along the front and rear direction.

20 Claims, 9 Drawing Sheets

U.S. PATENT DOCUMENTS

| | | | |
|---|---|---|---|
| 4,300,709 A * | 11/1981 | Page, Jr. | 224/275 |
| 4,512,503 A * | 4/1985 | Gioso | 224/539 |
| 4,580,653 A * | 4/1986 | Owens | 381/86 |
| 4,638,532 A * | 1/1987 | Yang et al. | 24/462 |
| 4,701,749 A * | 10/1987 | Barnes | 340/384.6 |
| 4,815,559 A * | 3/1989 | Shirley | 181/144 |
| 5,193,118 A * | 3/1993 | Latham-Brown et al. | 381/86 |
| 5,287,412 A * | 2/1994 | Etzel et al. | 381/86 |
| 5,841,877 A * | 11/1998 | Mihara | 381/86 |
| 6,237,715 B1 * | 5/2001 | Tracy | 181/156 |
| 2002/0057816 A1 * | 5/2002 | Kelly et al. | 381/353 |

FOREIGN PATENT DOCUMENTS

| | | | |
|---|---|---|---|
| EP | 0 523 410 A2 | | 1/1993 |
| EP | 1039748 A2 | * | 9/2000 |
| JP | 05236582 A | * | 9/1993 |
| JP | 05-276588 A | | 10/1993 |
| JP | 06-122347 A | | 5/1994 |
| JP | 2000278778 A | * | 10/2000 |
| JP | 2004229183 A | * | 8/2004 |
| JP | 2004-330951 A | | 11/2004 |

* cited by examiner 15  23  33a  25  1  29

LOW-FREQUENCY SOUND REPRODUCING SPEAKER APPARATUS

CROSS REFERENCE OF RELATED APPLICATION

This application is based on and claims priority under 35 U.S.C. §119 with respect to Japanese Patent Application No. 2005-037871 filed on Feb. 15, 2005, and Japanese Patent Application No. 2005-130529 filed on Apr. 27, 2005, the entire contents of which are incorporated herein by reference.

BACKGROUND OF THE INVENTION

The present invention relates to a low-frequency sound reproducing speaker apparatus of Kelton type connected to a vehicle mounted acoustic system as a subwoofer.

In recent years, demand of a vehicle mounted acoustic system constructed by a constitution of mounting a subwoofer with an object of reproducing heavy low-frequency sound is increased in accordance with spreading or the like of a theater system for vehicle mounted use.

In a background art, there have been proposed various kinds of subwoofers constructed by a constitution of containing a woofer unit having a large aperture in a large-sized hermetically closed cabinet and in a case of vehicle mounted use, assigned to a trunk room of a vehicle as a large-sized hermetically closed cabinet.

However, according to the constitution, by occupying the trunk room by the subwoofer, a luggage room space is not present and accommodation performance of the vehicle is significantly deteriorated.

Hence, in the case of the subwoofer for vehicle mounted use, small-sized formation poses an important problem and there have been proposed a subwoofer constituted by Kelton type suitable for high quality reproducing of low-frequency sound even by a cabinet having a small capacity and integrated to an arm rest of a seat (refer to, for example, JP-A-5-276588 and JP-A-6-122347), a woofer mounted on a seat cushion (seat portion) of a rear seat (refer to, for example, JP-A-2004-330951) and the like.

SUMMARY OF THE INVENTION

However, according to the constitution of being integrated to the arm rest of the seat, an outer shape dimension thereof is restricted by a dimension of the arm rest, even when Kelton type suitable for small-sized formation is adopted, it is difficult to ensure a proper capacity in correspondence with a reproducing frequency range in the cabinet to pose a problem that a reproducing function is restricted by a deficiency in the capacity.

Further, the dimension of the arm rest differs by a vehicle kind and therefore, there also poses a problem that it is difficult to provide general purpose performance to be able to be used commonly in a number of vehicle kinds, which is not suitable for a reduction in cost by mass production.

Further, there also poses a problem that the woofer of the constitution integrated to the arm rest of the seat cannot be removed simply.

On the other hand, in the case of the woofer mounted on the seat cushion of the rear seat, the woofer can simply be removed, further, also the capacity of the cabinet can comparatively freely be set in comparison with the woofer of the type integrated to the arm rest and the problem that the reproducing function is restricted by a deficiency in the capacity can be alleviated.

However, in the case of the woofer mounted on the seat cushion of the rear seat, there is needed a mechanism of firmly fixing the woofer to the seat and owing to the mechanism of fixing the woofer to the seat, there is a concern that a structure of the cabinet is restricted, or a capacity in the cabinet is sacrificed.

For example, in the case of the speaker apparatus described in JP-A-2004-330951, in order to fix the speaker apparatus to the seat by a seat belt belonging to the seat of the vehicle, a cylinder portion having a comparatively large aperture capable of inserting the seat belt is penetrated to form at a side face of the cabinet, however, owing to the cylinder portion, there poses a problem that an air chamber volume at inside of the cabinet is considerably reduced.

Further, generally, the cabinet of the subwoofer of the background art mounted on the seat cushion is constituted by a mode an outlook shape of which is constituted by a simple shape of a parallelepiped and which is mounted with a duct and a port for emitting sound at a vertical front face wall or a rear face wall. However, according to the mode, when a reclining seat is proximate to the front face wall or the rear face wall of the cabinet mounted with the duct and the port, there is brought about a state in which the port is closed by the reclining seat or the like to bring about a concern that an inherent low-frequency sound reproducing function cannot sufficiently be achieved since emittance of sound from the port is hampered.

Further, according to the cabinet of the subwoofer of the background art mounted on the seat cushion, the outlook shape is constituted by the simple shape of the parallelepiped, the lower face brought into contact with the seat cushion is constituted by a flat face and therefore, the cabinet is liable to be unsteady by recesses and projections of the seat cushion to also pose a problem that the cabinet is difficult to be fixed stably. In order to resolve the problem, there is also proposed a cabinet of screwing leg members constituting portions brought into contact with the seat cushion to, for example, four corners of the lower face of the cabinet, however, there poses a problem that an increase in cost is brought about by increasing a number of parts and a number of integrating steps for the leg portions to be screwed. Further, a load is operated to concentrate on a small contact area between the seat cushion and the leg member and therefore, there also poses a problem that an indentation mark of the leg portion remains on the seat cushion.

It is problem to be resolved by the invention to provide an excellent low-frequency sound reproducing speaker apparatus capable or promoting a reproducing function by ensuring a sufficient capacity in a cabinet, further, capable of being generally mounted to a number of vehicle kinds and therefore, capable of achieving a reduction in cost by mass production, further, capable of being easily attached and detached in mounting, without bringing about a reduction in an air chamber volume at inside of the cabinet or complication of a cabinet structure owing to an attaching and detaching mechanism, further, to provide a low-frequency sound reproducing speaker apparatus capable of achieving a stable low-frequency sound reproducing characteristic by ensuring a function of stably emitting sound without hampering emittance of sound from the port by closing the port by a reclining seat or the like, further, to provide a low-frequency sound reproducing speaker apparatus which can firmly be fixed without being unsteady when mounted on the seat cushion of the vehicle, further, in which an indentation mark is difficult to remain on the seat cushion, and which is excellent also in alleviating a load on the seat cushion.

In order to resolve the above-described problem, according to a first aspect of the invention, there is provided a low-frequency sound reproducing speaker apparatus of a Kelton type connected to a vehicle mounted acoustic system as a subwoofer, including: a speaker unit; a first air chamber for hermetically sealing a rear face the speaker unit; a second air chamber for surrounding a front face of the speaker unit; a cabinet which is partitioned into the first air chamber and the second air chamber by a partition plate attached with the speaker unit; and a duct and a port for emitting low-frequency sound of a specific frequency band in a sound wave generated at inside of the second air chamber by the speaker unit which are mounted with a cabinet wall forming the second air chamber, wherein: the cabinet is constituted by a shape of substantially a parallelepiped slender in a front and rear direction, a length dimension in the front and rear direction is set to a value substantially near to a depth dimension of a seat cushion of a vehicle, and a front face wall thereof is mounted with the duct and the port; the partition plate supports the front face of the speaker unit to direct to a side of a front face of the cabinet; and the cabinet is fixed to the seat cushion by binding a fixing belt laid at a lower face of the cabinet along the front and rear direction to the seat cushion.

BRIEF DESCRIPTION OF THE DRAWINGS

These and other objects and advantages of this invention will become more fully apparent from the following detailed description taken with the accompanying drawings in which.

DETAILED DESCRIPTION OF THE EMBODIMENTS

A preferable embodiment of a low-frequency sound reproducing speaker apparatus according to the invention will be explained in detail in reference to the drawings as follows.

Figure 1:
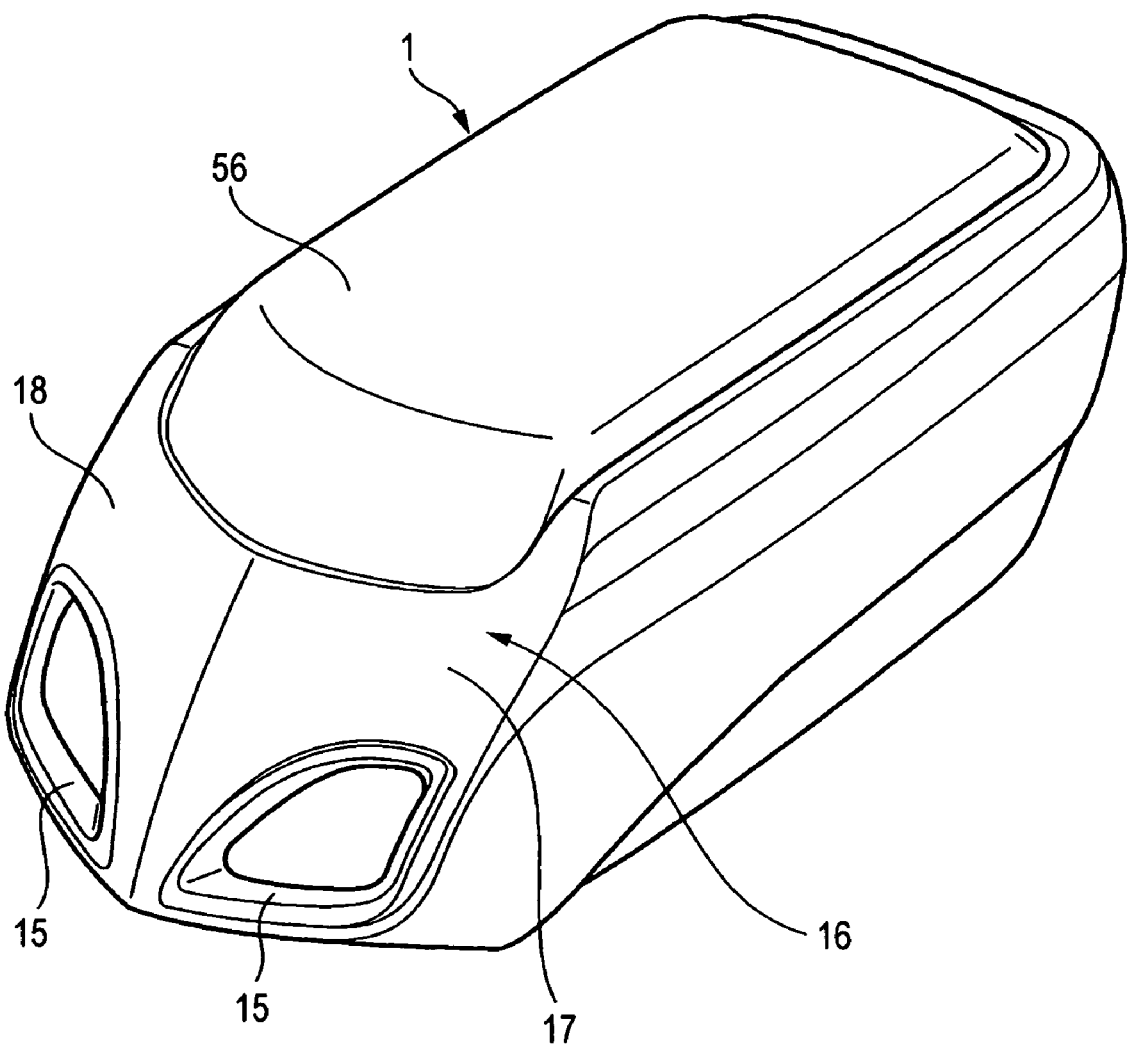
FIG. 1 is a perspective view of an embodiment of a low-frequency sound reproducing speaker apparatus according to the invention.
Figure 2:
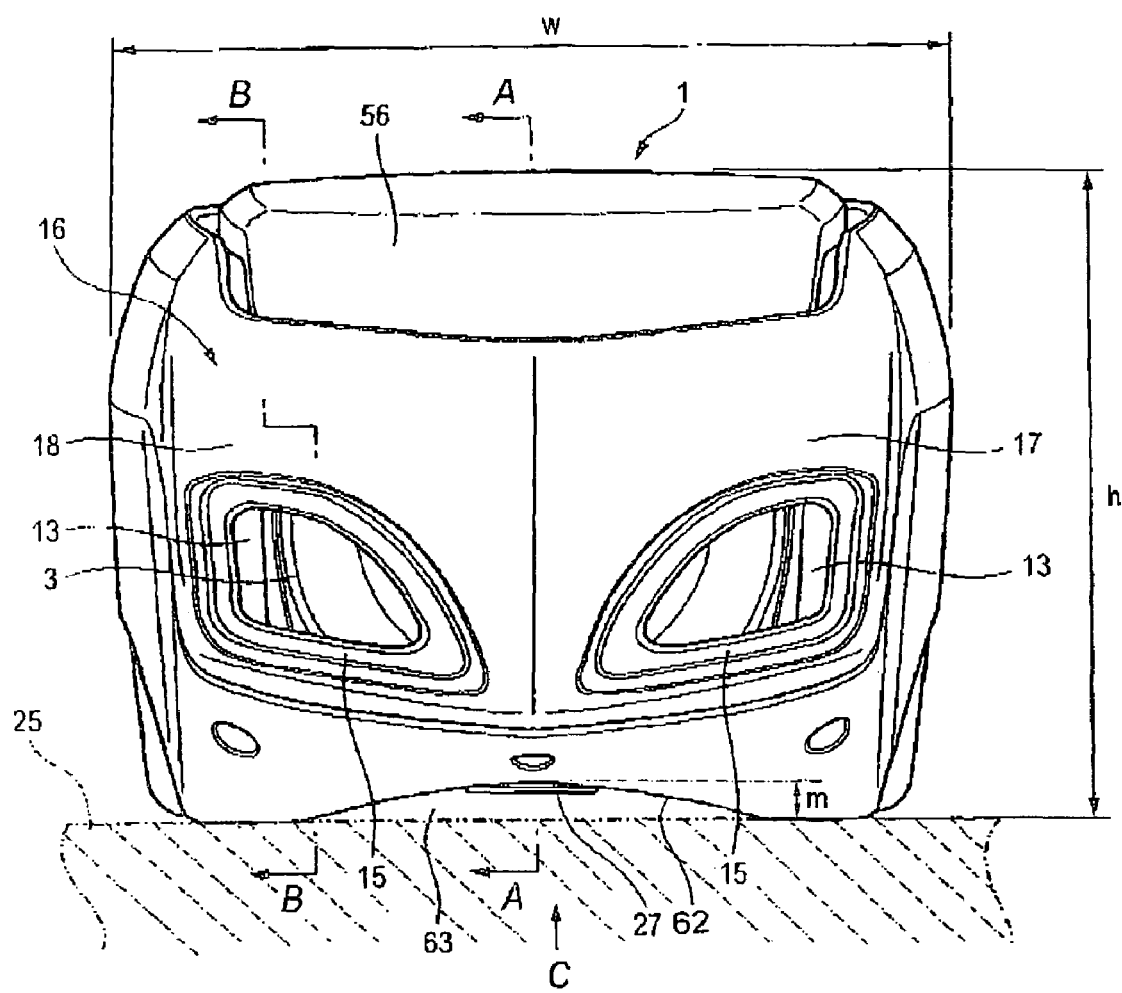
FIG. 2 is a front view of the low-frequency sound reproducing speaker apparatus shown in FIG. 1.
Figure 3:
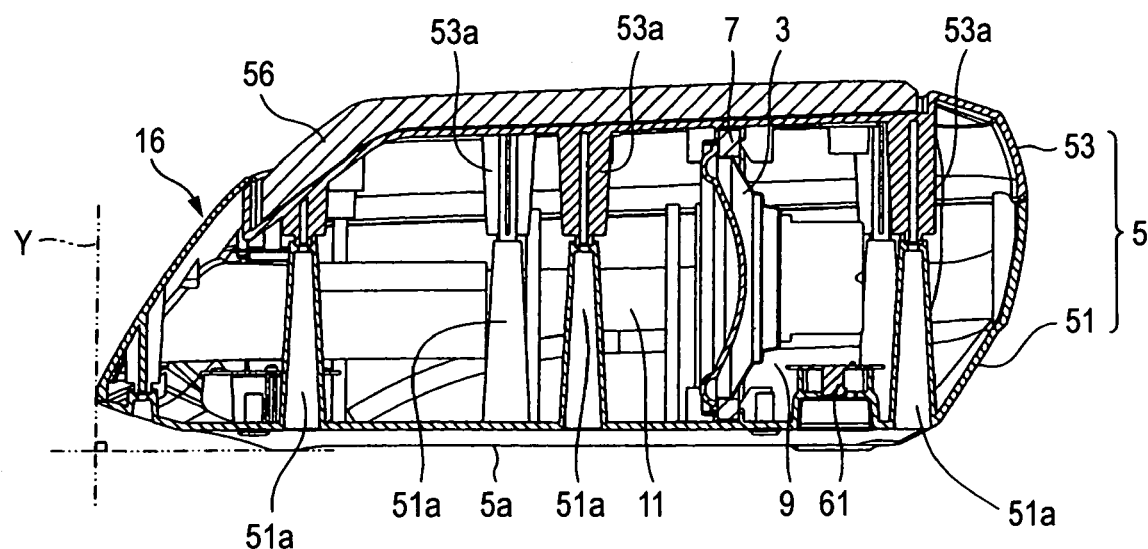
FIG. 3 is a sectional view taken along a line A-A of FIG. 2.
Figure 4:
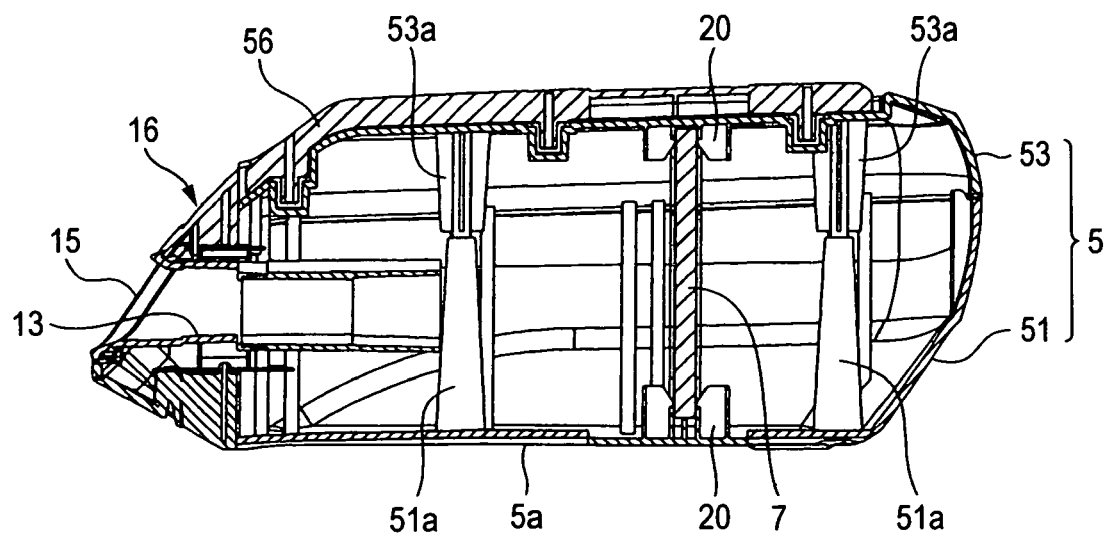
FIG. 4 is a sectional view taken along a line B-B of FIG. 2.
Figure 5:
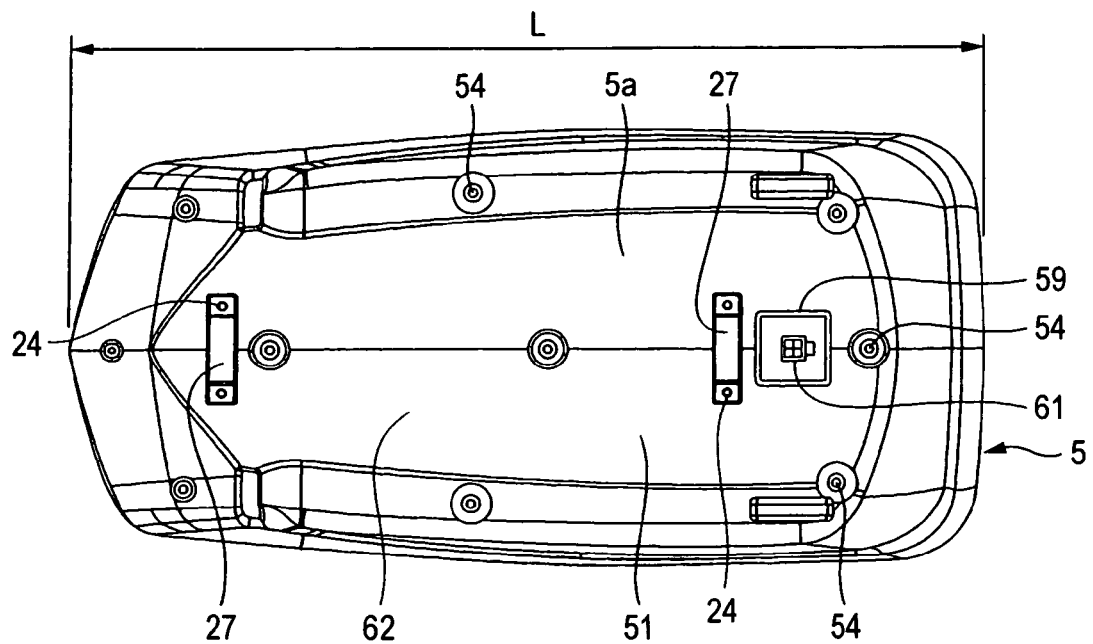
FIG. 5 is a view viewing FIG. 2 from a C arrow mark direction.
Figure 6:
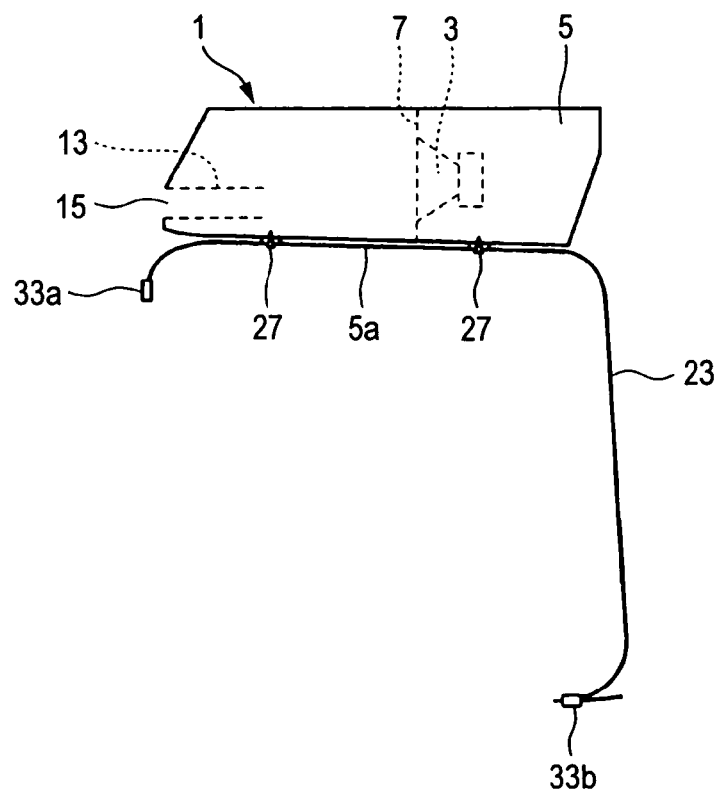
FIG. 6 is an outline side view of a state before attaching the low-frequency sound reproducing speaker apparatus shown in FIG. 1 to a seat of a vehicle.
Figure 7:
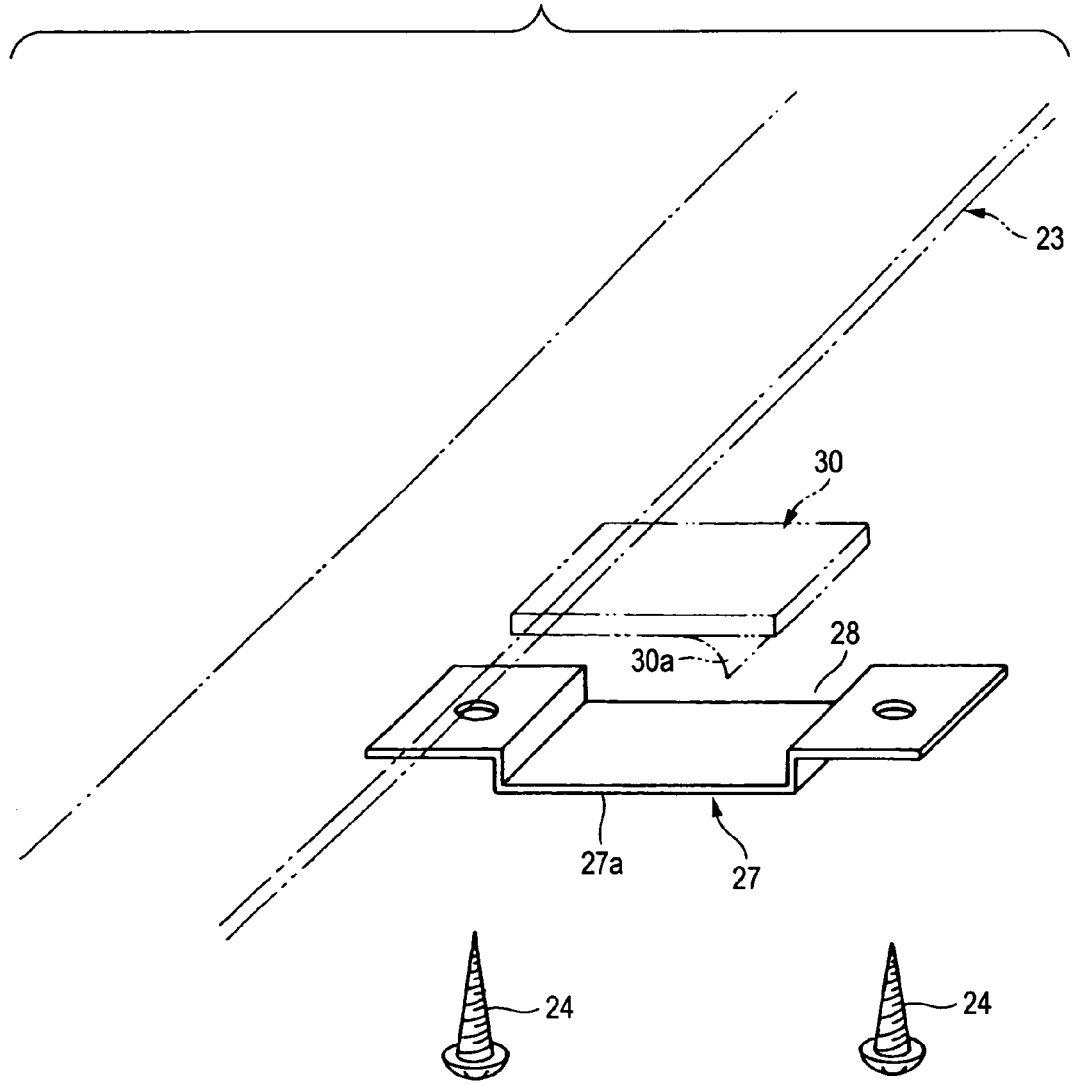
FIG. 7 is a disassembled perspective view showing an example of mounting a fixing belt to a belt holding bracket in the low-frequency sound reproducing speaker apparatus shown in FIG. 1.
Figure 8:
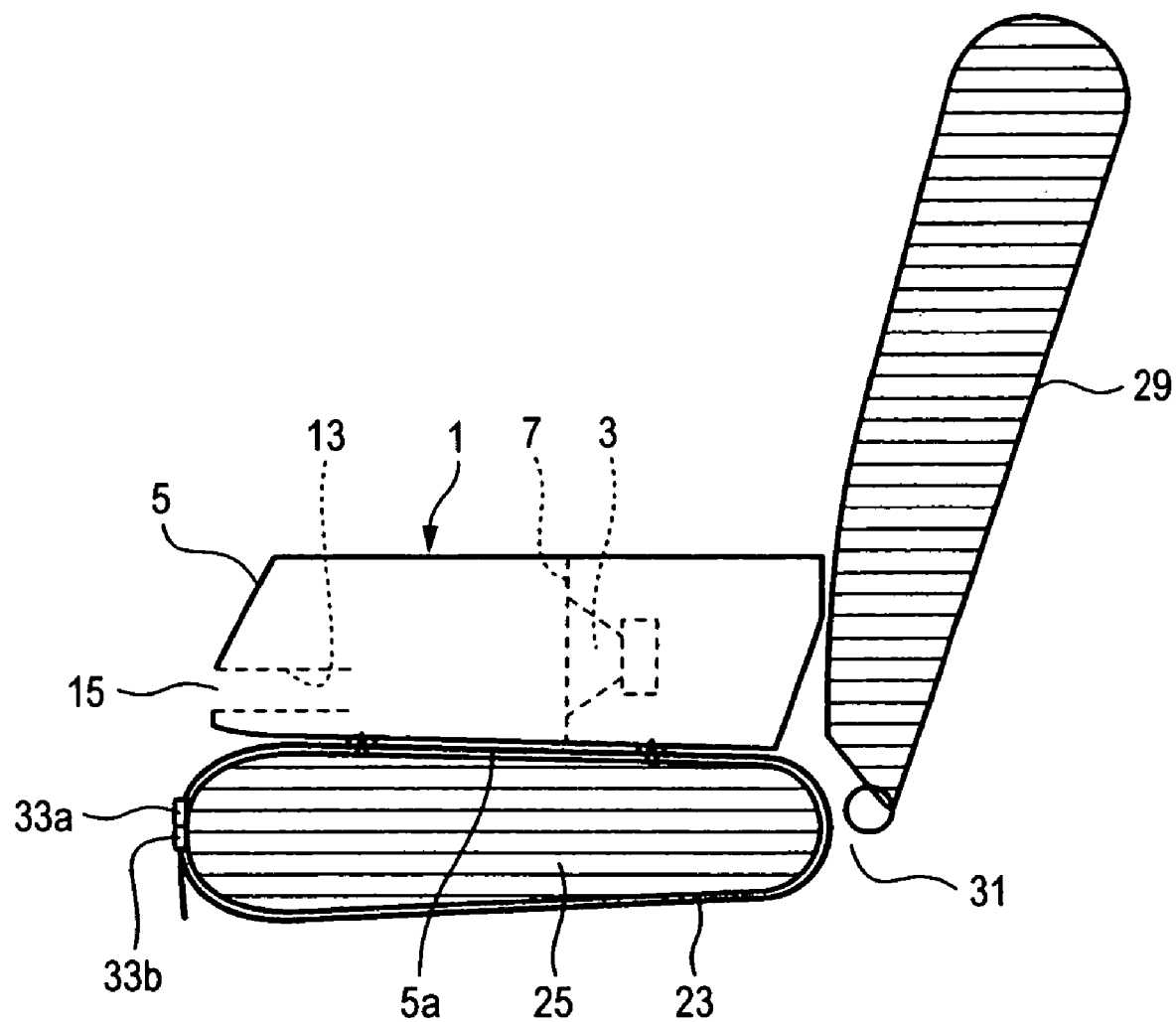
FIG. 8 is an explanatory view of a state of attaching the low-frequency sound reproducing speaker apparatus shown in FIG. 1 to a seat of a vehicle.
Figure 9:
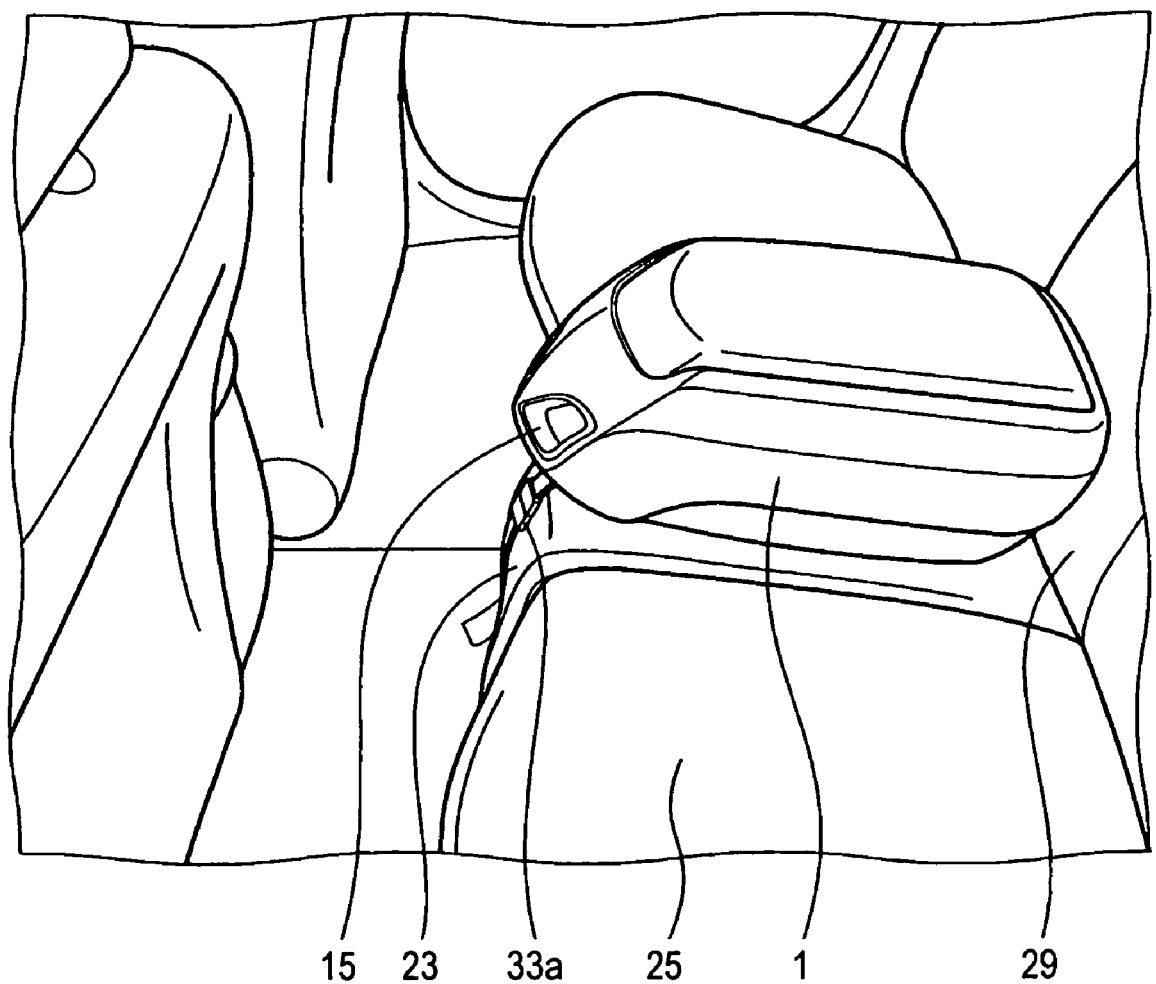
FIG. 9 is a perspective view of a state of attaching the low-frequency sound reproducing speaker apparatus shown in FIG. 1 to a rear seat of a passenger vehicle.

FIG. 1 is a perspective view of an embodiment of a low-frequency sound reproducing speaker apparatus according to the invention, FIG. 2 is a front view of the low-frequency sound reproducing speaker apparatus shown in FIG. 1, FIG. 3 is a sectional view taken along a line A-A of FIG. 2, FIG. 4 is a sectional view taken along a line B-B of FIG. 2, FIG. 5 is a view viewing FIG. 2 from an arrow mark C, FIG. 6 is an outline side view of a state of the low-frequency sound reproducing speaker apparatus shown in FIG. 1 before being attached to a seat of a vehicle, FIG. 7 is a disassembled perspective view showing an example of mounting a fixing belt to a belt holding bracket in the low-frequency sound reproducing speaker apparatus shown in FIG. 1, FIG. 8 is an explanatory view of a state of attaching the low-frequency sound reproducing speaker apparatus shown in FIG. 1 to a seat of a vehicle, FIG. 9 is a perspective view of a state of attaching the low-frequency sound reproducing speaker apparatus shown in FIG. 1 to a rear seat of a passenger vehicle.

A low-frequency sound reproducing speaker apparatus 1 according to the embodiment is a low-frequency sound reproducing speaker apparatus of Kelton type connected to a vehicle mounted acoustic system as a subwoofer and is constituted by a speaker unit 3 and a cabinet 5 containing the speaker unit 3.

As shown by FIG. 3 and FIG. 4, inside of the cabinet 5 is partitioned by a first air chamber 9 for hermetically sealing a rear face of the speaker unit 3 and a second air chamber 11 surrounding a front face of the speaker unit 3 by a partition plate (baffle plate) 7. Further, a front face wall 16 of the cabinet forming the second air chamber 11 is mounted with a duct 13 and a port 15 for emitting only low-frequency sound of a specific frequency range of a sound wave generated at inside of the second air chamber 11 by the speaker unit 3.

The cabinet 5 is a vessel a shape of substantially a parallelepiped slender in a front and rear direction and as shown by FIG. 5, a length dimension L in the front and rear direction is set to 435 mm of a value substantially near to a depth dimension of a seat cushion (seat portion) of a vehicle.

Further, as shown by FIG. 3, the front face wall 16 of the cabinet 5 mounted with the duct 13 and the port 15 is set to an inclined wall having a predetermined angle relative to a vertical face Y orthogonal to a cabinet lower face 5a. Specifically, the front face wall 16 is constituted by a slanted shape inclined downward to a front side. Further, as shown by FIG. 1 and FIG. 2, the front face wall 16 is constituted by a left and right symmetrical structure including left and right inclined walls 17, 18 inclined rearward from a center in a width direction of the cabinet to outer sides, and the duct 13 and the port 15 are mounted to each of the left and right inclined walls 17, 18.

The partition plate 7 is constituted by a shape of a thick plate having a strength sufficient for supporting the speaker unit 3, as shown by FIG. 4, a peripheral edge portion thereof is fitted and squeezed in airtight by a squeezing portion 20 formed at an inner face of the cabinet 5 and supported substantially vertically by a cabinet lower face 5a.

As shown by FIG. 3, the partition plate 7 supports the front face of the speaker unit 3 to direct to a side of the front face of the cabinet 5 and partitions inside of the cabinet 5 into the two front and rear air chambers 9, 11.

According to the low-frequency sound reproducing speaker apparatus 1 of the embodiment, as shown by FIG. 6 through FIG. 9, the cabinet 5 is fixed to a seat cushion 25 by binding a fixing belt 23 laid to the cabinet lower face 5a along the front and rear direction to the seat cushion 25 of a vehicle.

As shown by FIG. 6, the fixing belt 23 is a belt member formed by woven fabric same as that of a seat belt or the like of the vehicle, and both ends thereof are mounted with connecting buckles 33a, 33b of one touch type for connecting both ends of the belt.

As shown by FIG. 5, at the cabinet lower face 5a of the cabinet 5, belt holding brackets 27 made by metal plates are screwed to be fixed by respective two pieces of screws 24 at two front and rear portions on a center line in a width direction of the cabinet. As shown by FIG. 7, each belt holding bracket 27 forms a belt inserting groove 28 between the belt holding bracket 27 and the lower face 5a. A sheet-like elastic friction member 30 is mounted to an inner face of a plate portion 27a of the belt holding bracket 27 forming the belt inserting groove 28. The sheet-like elastic friction member 30 is mounted with an adhesive layer at one face of the sheet by synthetic rubber or the like having predetermined elastic property and friction property (friction coefficient) and is fixed to the belt holding bracket 27 by peeling off a cover sheet 30a covering the adhesive layer and being pasted to an inner face of the plate portion 27a.

The fixing belt 23 inserted through the belt inserting groove 28 is pressed to the cabinet lower face 5a by the sheet-like elastic friction member 30 pasted to the plate portion 27a and is fixed to the cabinet 5 by a pressing force and a friction force by the sheet-like elastic friction member 30.

As shown by FIG. 8, the fixing belt 23 fixed to the cabinet lower face 5a is attachably and detachably fastened to be fixed to the seat cushion 25 by passing one end thereof through a gap 31 between the seat cushion 25 and a seat back 29, pulling around the one end to the front face of the seat cushion 25 and connecting both ends thereof attachably and detachably by the connecting buckles 33a, 33b of the one touch type.

Further, when a coupling position by the connecting buckles 33a, 33b is disposed on a front face side of the seat cushion 25 and the fixing belt 23 is fixed to the lower face of the cabinet 5 to be facilitated to operate to couple and separate the connecting buckles 33a, 33b, the operation is preferably carried by the following procedure.

First, the sheet-like elastic friction member 30 is pasted to the inner face of the belt portion 27a of the belt holding bracket 27. Next, by bringing about a state in which the fixing belt 23 is made to pass to a position constituting the belt inserting groove 28 on the belt holding bracket 27, the belt holding bracket 27 is tacked to the cabinet lower face 5a to a degree of capable of moving the fixing belt 23 by the screw 24.

Successively, the position of the fixing belt 23 is adjusted such that one of the connecting buckles 33a is disposed to the front face side of the seat cushion 25. Thereafter, the screw 24 is actually fastened to fix the fixing belt 23 to the cabinet 5 by the pressing force and the friction force by the sheet-like elastic friction member 30.

According to the cabinet 5 explained above, as shown by FIG. 2, a width dimension w is set to a value (equal to or smaller than, for example, 210 mm) smaller than a width of a path (walk through) mounted between the left and right seats of the vehicle. Further, a height dimension h is set to about 175 mm. The above-described outer shape dimensions of the cabinet 5 are for enabling to utilize the cabinet 5 as an arm rest when mounted to a rear seat of a passenger vehicle, further, enable to move to a path portion or the like between a driver's seat and a passengers seat when the cabinet is removed from the seat.

In the case of the embodiment, as shown by FIG. 3 through FIG. 5, the cabinet 5 is formed to be divided upward and downward to a lower case 51 attachably and detachably attached with the fixing belt 23 at the lower face 5a and an upper case 53 for covering an upper portion of the lower case 51.

Both of the lower case 51 and the upper case 53 are formed by injection molding of synthetic resin.

Further, the upper case 53 and the lower case 51 are mounted with connecting stays 51a, 53a for supporting a load in an up and down direction by butting front ends thereof to connect to each other at a pertinent interval therebetween to cross center portions of the respective air chambers 9, 11.

The connecting stay 51a formed at the lower case 51 is formed with a hollow portion for inserting a screw 54 from the side of the lower face 5a as shown in FIG. 5. Further, the front end of the connecting stay 53a to be butted to a front end of the connecting stay 51a is formed with a female screw screwed with the screw 54 and the lower case 51 and the upper case 53 are coupled by fastening the screw 54.

Further, according to the low-frequency sound reproducing speaker apparatus 1 of the embodiment, an upper face of the upper case 53 constituting the cabinet 5 is pasted with a cushion member 56. The cushion member 56 is a decorative outer skin and can be constructed by constitution in which a surrounding of a mold product of formed resin or the like more elastin than a resin forming the lower case 51 and the upper case 53, or a sponge member which is easier to deform is covered by synthetic skin, or real skin or the like.

In the case of the embodiment, as shown also in FIG. 1, the front face wall 16 mounted with the duct 13 and the port 15 is formed integrally with the upper case 53 as a front face wall of the upper case 53 and the ducts 13 and the ports 15 are mounted at a total of two portions to be aligned in the left and right direction by respective ones at the respective inclined walls 17, 18 aligned in the left and right direction.

Further, in the case of the low-frequency sound reproducing speaker apparatus 1 of the embodiment, an amplifier for amplifying an input signal to the speaker unit 3 is separately attached to outside of the cabinet 5. Therefore, a recess portion 59 on a rear portion side of the lower face 5a of the cabinet 5 is mounted with an input terminal 61 for connecting an output line from the amplifier.

Further, in the case of the embodiment, as shown by FIG. 2, the cabinet lower face 5a is formed by a recessed curve face 62 in which a center portion is recessed more than both sides in a width direction of the cabinet.

Further, as shown by FIG. 5, the recessed curve face 62 is provided in a shape of a trough extended in the front and rear direction of the cabinet 5 and a cavity 63 formed by the recessed curve face 62 between the seat cushion 25 and the recessed curve face 62 is opened in the front and rear direction of the cabinet 5.

Further, the recessed curve face 62 is constituted by a circular arc face maximizing a recessed amount at a center position in the width direction of the cabinet, as shown by FIG. 2, the recessed amount m at the center position in the width direction of the cabinet is set to be larger than an amount of projecting the belt holding bracket to a side of the seat cushion 25 of the belt holding bracket 27. Therefore, the belt holding bracket 27 is not brought into contact with the seat cushion 25.

The low-frequency sound reproducing speaker apparatus 1 explained above is basically constituted by Kelton type suitable for small-sized formation of the cabinet 5 and constituted to be installed above the seat cushion 25 as shown by FIG. 8 and FIG. 9 and therefore, in comparison with that of a type of being integrated to the arm rest of the background art, a reproducing function can be promoted by ensuring a sufficient capacity for the cabinet 5.

Further, the apparatus can independently be designed separately from the seat of the vehicle and can generally be mounted for a number of vehicle kinds and therefore, a reduction in cost by mass production can also be achieved.

Further, owing to the structure of fixing the apparatus to the vehicle seat by binding the fixing belt 23 laid at the lower face 5a of the cabinet 5 to the seat cushion 25, as shown by FIG. 6 and FIG. 8, by mounting the connecting buckles 33a, 33b of the one touch type to the both ends of the fixing belt 23, the apparatus can easily be attached and detached in mounting the apparatus to the vehicle seat.

Further, the fixing belt 23 may be provided with the strength sufficiently for supporting the weight of the low-frequency sound reproducing speaker apparatus 1, in comparison with the seat belt for supporting a passenger, the fixing belt 23 may be constituted by a small-sized and light-weighted belt and therefore, in comparison with the speaker apparatus of the background art fixed to the seat by the seat belt, the air chamber volume at inside of the cabinet 5 is not reduced or the cabinet structure is not complicated owing to the attaching and detaching mechanism (that is, belt).

Further, the cabinet 5 which is long in the front and rear direction is firmly fixed to the seat cushion 25 by the belt 23 laid along a length direction thereof and therefore, the speaker apparatus 1 is not swayed by vibration or the like in running the vehicle.

Further, the cabinet lower face 5a pressed by the seat cushion 25 by being fastened by the fixing belt 23 is mounted with the recessed curved face 62 at a center portion thereof and only both side edges of the lower face are brought into contact therewith. Therefore, even when there is a waviness or the like on a surface of the seat cushion 25, a portion of a ridge of the waviness of the seat cushion moves to the cavity 63 formed by the recessed curved face 62, the both side edges of the cabinet lower face 5a are firmly brought into contact with the seat cushion 25 and therefore, in comparison with the cabinet of the background art the lower face of which is formed by the flat face, the cabinet is seated stably, the unsteadiness is difficult to be brought about and the cabinet can be fixed thereto stably.

Further, the both side edges of the cabinet face 5a brought into contact with the seat cushion 25 are extended along a direction of inserting the fixing belt 23 to achieve an effect of preventing the cabinet from being slipped in the width direction by biting the seat cushion 25 and therefore, the cabinet can further stably be fixed to the seat cushion 25.

Further, in comparison with the background art structure for screwing the leg members to four corners of the cabinet lower face, an increase in a number of parts and a number of integrating steps can be avoided and an increase in cost can be prevented.

Further, in comparison with the background art structure for screwing the leg member to the four corners of the cabinet lower face, an area thereof brought into contact with the seat cushion 25 can be increased and therefore, a drawback that an indentation mark remains on the seat cushion can be restrained.

Further, the cavity 63 formed between the recessed curved face 62 of the cabinet lower face 5a and the seat is opened in the front and rear direction of the cabinet and therefore, vibration of the cabinet is not confined at inside of the cavity 63 to thicken sound.

Further, according to the low-frequency sound reproducing speaker apparatus 1 of the embodiment, when, for example, a number of passengers is increased, and the low-frequency sound reproducing speaker apparatus 1 installed on the seat constitutes a hindrance, the low-frequency sound reproducing speaker apparatus 1 can be removed from the seat to move to the path (walk through) between the left and right front seats, or can be moved to the trunk room, the position of installing the apparatus is easily changed and therefore, the apparatus can flexibly deal with the change in a number of passengers or the like.

Further, according to the low-frequency sound reproducing speaker apparatus 1 of the embodiment, the cabinet 5 is formed by the upper case 53 and the lower case 51 divided in the up and down direction and therefore, by forming the cases 51, 53 individually by injecting molding of resin, a reduction in cost can be achieved by preventing a structure of a molding die from being complicated.

Further, different from a case of being divided in two in the front and rear direction, directions of projecting the connecting stays 51a, 53a of the connecting stays 51a, 53a crossing insides of the respective air chambers 9, 11 in the up and down direction coincide with directions of removing dies and therefore, the connecting stays 51a, 53a can easily be formed, and by butting to connect the stays of the respective cases, a withstand load between the upper and lower faces of the cabinet 5 can easily be increased. As a result, even when a passenger or the like leans on or rides on the cabinet 5, the strength sufficient for enabling to prevent the cabinet 5 from being deformed or destructed can easily be ensured.

Further, according to the low-frequency sound reproducing speaker apparatus 1 of the embodiment, when, for example, as shown by FIG. 9, the position of installing the apparatus is disposed at a center of a rear seat of the passenger vehicle, the cushion member 56 on the upper face of the cabinet 5 can be utilized as the arm rest of the passenger of the rear seat by an excellent touch to promote availability.

Further, according to the low-frequency sound reproducing speaker apparatus 1 of the embodiment, by mounting the ducts 13 and the ports 15 at the two portions, sectional areas of the ducts 13 and the ports 15 can be increased without reducing rigidities thereof and a degree of freedom of setting a reproducing frequency band by setting dimensions of the ducts 13 and the ports 15 is promoted.

Further, according to the low-frequency sound reproducing speaker apparatus 1 of the embodiment, the amplifier is constituted separately from the cabinet 5 and therefore, heat generated from the amplifier is not confined at inside of the cabinet 5, it is not necessary to mount the cabinet 5 with a duct for cooling the amplifier or the like and therefore, the acoustic function can be promoted by promoting a hermetically sealing degree requested for the first air chamber 9 of the cabinet 5.

Further, according to the low-frequency sound reproducing speaker apparatus 1 of the embodiment, by the pressing force and the friction force by the sheet-like elastic friction member 30 mounted to the inner face of the plate portion 27a of the bracket 27 forming the belt inserting groove 28 between the inner face and the lower face 5a of the cabinet 5, the fixing bolt 23 laid to the lower face 5a of the cabinet 5 is fixed to the lower face 5a of the cabinet 5 and therefore, the position of fixing the cabinet 5 can be prevented from being shifted by slipping the fixing belt 23 and the low-frequency sound reproducing speaker apparatus 1 can firmly be fixed to the seat.

Further, it can be prevented that the operation of attaching and detaching the apparatus to and from the seat becomes difficult by shifting the position of the coupling end of the fixing belt 23 by slipping the belt and the handling performance of the apparatus in attaching and detaching the belt to and from the seat can be promoted.

Further, in the case of the cabinet 5 of the embodiment, as shown also in FIG. 3, the front face wall 16 of the cabinet 5 mounted with the duct 13 and the port 15 is set to the inclined wall having the predetermined angle relative to the vertical face Y and therefore, for example, even when the front reclining seat becomes proximate to the front wall face 16 since the position of the seat of the vehicle is shifted to the front and rear direction, the proximate reclining seat does not close the port 15 constituting the port of emitting sound.

Therefore, emittance of sound from the port is not hampered by the reclining seat or the like and a stable low-frequency sound reproducing characteristic can be achieved by ensuring a stable sound emitting function.

Further, in the case of the embodiment, the ducts 13 and the ports 15 are respectively mounted to the two inclined walls 17, 18, the two inclined walls 17, 18 are inclined in directions reverse to each other and therefore, even when the cabinet becomes proximate to either of left and right side panels or the like at inside of the vehicle, the ports 15 can be avoided from being closed by the side panel, and the stable low-frequency sound reproducing characteristic can be achieved by ensuring a stable sound emitting function.

Figure 10:
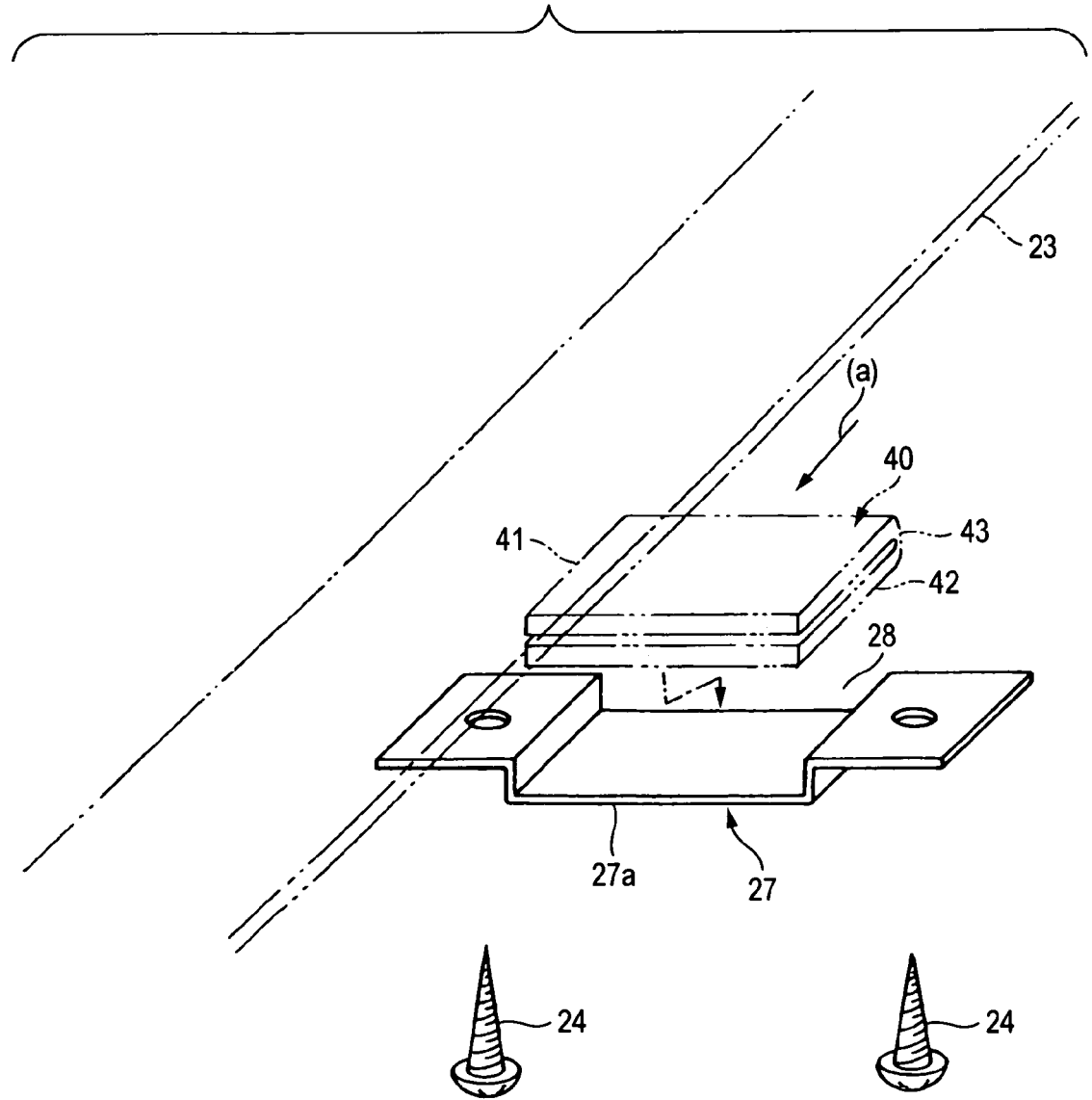
FIG. 10 is a disassembled perspective view showing other example of mounting the fixing belt to the belt holding bracket in the low-frequency sound reproducing speaker apparatus shown in FIG. 1.

Further, it is also conceivable to constitute the sheet-like elastic friction member mounted to the plate portion 27a of the belt holding bracket 27 by a structure shown in FIG. 10 for stopping the belt from being slipped.

A sheet-like elastic friction member 40 shown in FIG. 10 is mounted to the belt holding bracket 27 in a state of squeezing the plate portion 27a by an inner face contact portion 41 and an outer face contact portion 42 by a twice-folded structure in which the outer face contact portion 42 to be covered on the outer face of the plate portion 27a is extended from one end edge of the inner face contact portion 41 to be covered on the inner face of the plate portion 27a.

Although in the case of the embodiment, there is constructed a constitution in which faces of the inner face contact portion 41 and the outer face contact portion 42 brought into contact with the plate portion 27a are provided with adhesive layers similar to that in the case of the sheet-like elastic friction member 30 shown in FIG. 7 and fixed to the plate portion 27a by adhesion, it is also conceivable to construct a constitution which is not provided with the adhesive layers.

The procedure of positioning to fix the fixing belt 23 to the lower face 5a of the cabinet by the belt holding bracket 27 mounted with the sheet-like elastic friction member 40 may be similar to that in the case of the belt holding bracket 27 mounted with the sheet-like elastic friction member 30.

The sheet-like elastic friction member 40 shown in FIG. 10 is constituted by a structure of being integrally formed with the inner face contact portion 41 and the outer face contact portion 42 for squeezing the plate portion 27a of the belt holding bracket 27, even when the sheet-like elastic friction member 40 is operated with a force in an arrow mark (a) direction of the drawing by friction with the belt 23, a folded portion 43 between the inner face contact portion 41 and the outer face contact portion 42 is caught by an end of the plate portion 27a of the bracket 27 and therefore, a strength of fixing the sheet-like elastic friction member 40 to the belt holding bracket 27 is intensified, a problem of a reduction in a belt holding force owing to exfoliation of the sheet-like elastic friction member is prevented from being posed and an effect of preventing the belt from being slipped can stably be maintained over a long period of time.

Further, according to the invention, a specific shape of the front face wall 16 mounted with the duct 13 and the port 15 is not limited to that in the above-described embodiment.

Figure 11A:
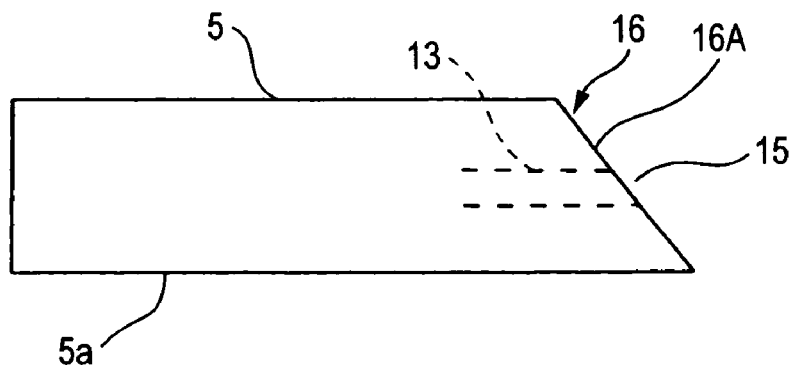
FIGS. 11A to 11C illustrate schematic views for explaining other embodiments of positions of mounting ducts and ports on a cabinet.
Figure 11B:
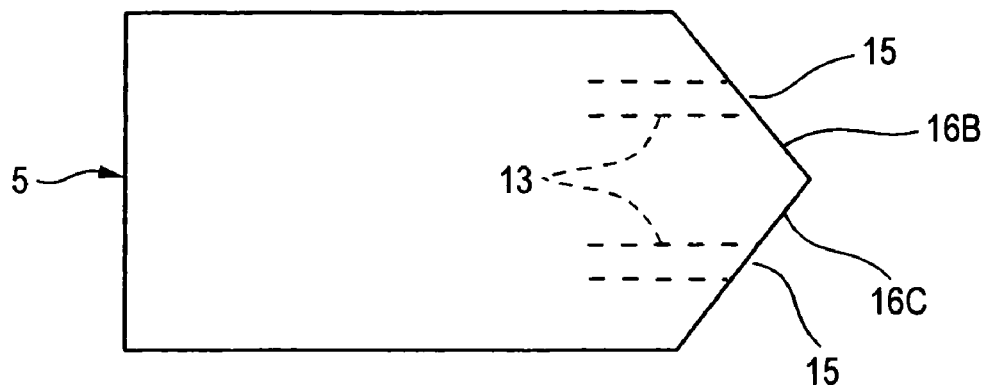
Figure 11C:
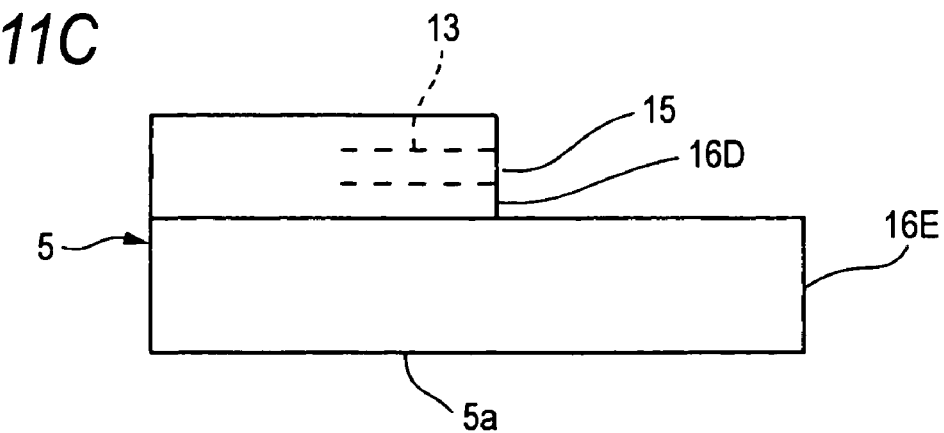

FIGS. 11A to 11C illustrate schematic views for explaining other embodiments of positions of mounting the duct and the port on the cabinet. For example, as shown by FIG. 11A, the front face wall 16 can also be constituted by a single slanted wall 16A which is not inclined in the left and right direction and a front end of which is simply inclined downward to the front side, further, as shown by FIG. 11B, the front face wall 16 may be formed by a pair of left and right inclined walls 16B, 16C both sides of which are retreated to a rear side without constituting the slanted wall inclined downwardly to the front side.

Further, as shown by FIG. 11C, there may be constructed a constitution in which inside of the cabinet 5 is divided in an up and down direction by a partition wall for supporting a speaker unit, a front face 16D of the upper cabinet portion is retreated more than a front face 16E of the lower cabinet portion and the duct 13 and the port 15 are mounted to a retreated front face 16D. Thereby, similar to the case of constituting the inclined wall, the port 15 can be prevented from being closed by the reclining seat or the like.

As described in details above, the low-frequency sound reproducing speaker apparatus according to the embodiment of the invention is the low-frequency sound reproducing speaker apparatus 1 of Kelton type in which inside of the cabinet 5 is partitioned into the first air chamber 9 for hermetically sealing the rear face of the speaker unit 3 and the second air chamber 11 for surrounding the front face of the speaker unit 3 by the partition plate 7 attached with the speaker unit 3, the cabinet wall forming the second air chamber 11 is mounted with the duct 13 and the port 15 for emitting low-frequency sound at a specific frequency band in sound wave generated in the second air chamber 11 by the speaker unit 3 to outside and which is connected to the vehicle mounted acoustic system as the subwoofer, the cabinet 5 is constituted by the shape of substantially the parallelepiped slender in the front and rear direction, the length dimension in the front and rear direction is set to the value substantially near to the depth dimension of the seat cushion 25, the front wall face is mounted with the duct 13 and the port 15, the partition plate 7 supports the front face of the speaker unit 3 to direct to the front face side of the cabinet and partitions inside of the cabinet 5 in the front and rear direction, and the cabinet 5 is fixed to the seat cushion 25 by binding the fixing belt 23 laid at the lower face of the cabinet 5 in the front and rear direction to the seat cushion 25.

Thereby, there can be provided the excellent low-frequency sound reproducing speaker apparatus capable of promoting the reproducing function by ensuring the sufficient capacity for the cabinet 5, further, capable of being mounted generally to a number of vehicle kinds and therefore, capable of achieving a reduction in cost by mass production, further, capable of being easily attached and detached in mounting without bringing about a reduction in an air chamber volume at inside of the cabinet 5 and complication of the cabinet structure owing to the attaching and detaching mechanism.

Further, the front face wall 16 of the cabinet mounted with the duct 13 and the port 15 is constituted by an inclined wall and therefore, even in a case of constituting a state of installing the apparatus in which the front end of the front face wall 16 becomes proximate to the reclining seat, or a substantially vertical wall face of a side panel or the like at inside of the vehicle, the port 15 constituting the port of emitting sound cannot be closed and the stable low-frequency sound reproducing characteristic can be achieved by ensuring a stable sound emitting function.

Further, the cabinet lower face 5a is formed by the recessed curved face 62 in which the center portion is more recessed than the both side edges of the cabinet 5 and therefore, when installed to the seat cushion 25 of the vehicle, the cabinet 5 can be fixed in a stable state in which the apparatus is seated stably without being unsteady.

What is claimed is:

1. A low-frequency sound reproducing speaker apparatus of a Kelton type connected to a vehicle mounted acoustic system as a subwoofer, comprising:
    a speaker unit;
    a first air chamber for hermetically sealing a rear face of the speaker unit;
    a second air chamber for surrounding a front face of the speaker unit;
    a cabinet which is partitioned into the first air chamber and the second air chamber by a partition plate attached with the speaker unit; and
    a duct and a port for emitting low-frequency sound of a specific frequency band in a sound wave generated at inside of the second air chamber by the speaker unit which are mounted with a cabinet wall forming the second air chamber, wherein:
    the cabinet is constituted by a shape of substantially a parallelepiped slender in a front and rear direction, a length dimension in the front and rear direction is set to a value substantially near to a depth dimension of a seat cushion of a vehicle, and a front face wall thereof is mounted with the duct and the port;
    the partition plate supports the front face of the speaker unit to direct sound towards a side of a front face of the cabinet;
    the cabinet is fixed to the seat cushion by binding a fixing belt laid at a lower face of the cabinet along the front and rear direction to the seat cushion; and
    the cabinet is formed to be divided upward and downward into a lower case on a lower face of which the fixing belt is attachably and detachably attached and an upper case for covering the lower case, and the upper case and the lower case are mounted with connecting stays for supporting a load in an up and down direction by butting to connect front ends to each other to cross center portions of the respective air chambers.

2. The low-frequency sound reproducing speaker apparatus according to claim 1, wherein
    a cushion member is pasted on an upper face of an tipper case constituting the cabinet.

3. The low-frequency sound reproducing speaker apparatus according to claim 1, wherein
    the front face wall mounted with the duct and the port is integrally formed with an upper case as a front face wall thereof, and the ducts and the ports are mounted at two portions to be aligned in a left and right direction.

4. The low-frequency sound reproducing speaker apparatus according to claim 1, wherein
    an amplifier for amplifying an input signal to the speaker unit is separately attached to an outer portion of the cabinet.

5. A low-frequency sound reproducing speaker apparatus of a Kelton type connected to a vehicle mounted acoustic system as a subwoofer, comprising:
    a speaker unit;
    a first air chamber for hermetically sealing a rear face of the speaker unit;
    a second air chanber for surrounding a front face of the speaker unit;
    a cabinet which is partitioned into the first air chamber and the second air chamber by a partition plate attached with the speaker unit; and
    a duct and a port for emitting low-frequency sound of a specific frequency band in a sound wave generated at inside of the second air chamber by the speaker unit which are mounted with a cabinet wall forming the second air chamber, wherein:
    the cabinet is constituted by a shape of substantially a parallelepiped slender in a front and rear direction, a length dimension in the front and rear direction is set to a value substantially near to a depth dimension of a seat cushion of a vehicle, and a front face wall thereof is mounted with the duct and the port;
    the partition plate suppors the front face of the speaker unit to direct sound towards a side of a front face of the cabinet;
    the cabinet is fixed to the seat cushion by binding a fixing belt laid at a lower face of the cabinet along the front and rear direction to the seat cushion; and
    the fixing belt laid at the lower face of the cabinet along the front and rear direction is inserted through a belt inserting groove formed by a belt holding bracket screwed to the lower face of the cabinet between the belt holding bracket and the lower face of the cabinet, and is fixed to the cabinet by a pressing force and a friction force by a sheet-like elastic friction member mounted to an inner face of a plate portion of the bracket forming the belt inserting groove.

6. The low-frequency suond reproducing speaker apparatus according to claim 5, wherein
    the sheet-like elastic friction member mounted to the plate portion of the belt holding bracket is constituted by a structure in which an outer face contact portion covered to an outer face of the plate portion is extended from one end edge of an inner face contact portion covered to the inner face of the plate portion, and is mounted to the belt holding bracket in a state or squeezing the plate portion by the inner face contact portion and the outer face contact portion.

7. A low-frequency sound reproducing speaker apparatus of a Kelton type connected to a vehicle mounted acoustic system as a subwoofer, comprising:
    a speaker unit;
    a first air chamber fot hermetically sealing a rear face of the speaker unit;
    a second air chamber ror surrounding a front face of the speaker unit;
    a cabinet which is partitioned into the first air chamber and the second air chamber by a partition plate attached with the speaker unit; and a duct and a por for emitting low-frequency sound of a specific frequency band in a sound wave generated at inside of the second air chamber by the speaker unit which are mounted with a cabinet wall forming the second air chamber, wherein:

the cabinet is constituted by a shape of substantially a parallelepiped slender in a front and rear direction, a length dimension in the front and rear direction is set to a value substantially near to a depth dimension of a seat cushion of a vehicle, and a front face wall thereof is mounted with the duct and the port;

the partition plate supports the front face of the speaker unit to direct sound towards a side of a front face of the cabinet;

the cabinet is fixed to the seat cushion by binding a fixing belt laid at a lower face of the cabinet along the front and rear direction to the scat cushion; and the front face wall of the cabinet mounted with the duct and the port is set to art inclined wall having a predetermined angle relative to a vertical face orthogonal to the lower face of the cabinet.

8. The low-frequency sound reproducing speaker apparatus according to claim 7, wherein the front face wall of the cabinet mounted with the duct and the port is constituted by a left and right symmetric structure inclined rearward from a center in a width direction of the cabinet to outer sides, and each of left and right inclined walls thereof is mounted with a duct and a port.

9. The low-frequency sound reproducing speaker apparatus accordiug to claim 1, wherein the lower face of the cabinet is formed by a recessed curved face in which a center portion thereof is more recessed than the both sides in the width direction of the cabinet.

10. The low-frequency sound reproducing speaker apparatus according to claim 9, wherein the recessed curved face of the lower face of the cabinet is constituted by a shape of a trough extended along the front and rear direction of the cabinet and a cavity formed by the recessed curve face between the recessed curve face and the seat cushion is opened in the front and rear direction of the cabinet.

11. The low-frequency sound reproducing speaker apparatus according to claim 5, wherein a cushion member is pasted on an upper face of the upper case constituting the cabinet.

12. The low-frequency sound reproducing speaker apparatus according to claim 5, wherein the front face wall mounted with the duct and the port is integrally formed with the upper case as a front face wall thereof, and the ducts and the ports are mounted at two portions to be aligned in a left and right direction.

13. The low-frequency sound reproducing speaker apparatus according to claim 5, wherein an amplifier for amplying an input signal to the speaker unit is separately attached to an outer portion of the cabinet.

14. The low-frequency sound reproducing speaker apparatus according to claim 5, wherein the lower face of the cabinet is formed by a recessed curved face in which a center portion thereof is more recessed than the both sides in the width direction of the cabinet.

15. The low-frequency sound reproducing speaker apparatus according to claim 14, wherein the recessed curved race of the lower face of the cabinet is constituted by a shape of a trough extended along the front and rear direction of the cabinet and a cavity formed by the recessed curve face between the recessed curve face and the scat cushion is opened in the front and rear direction of the cabinet.

16. The low-frequency sound reproducing speaker apparatus according to claim 7, wherein a cushion member is pasted on an upper face of the upper ease constituting the cabinet.

17. The low-frequency sound reproducing speaker apparatus according to claim 7, wherein the front face wall mounted with the duct and the port is integrally formed with the upper case as a front face wall thereog and the ducts and the ports are mounted at two portions to be aligned in a left and right direction.

18. The low-frequency sound reproducing speaker apparatus according to claim 7, wherein an amplifier for amplifying an input signal to the speaker unit is separately attached to an outer portion of the cabinet.

19. The low-frequency sound reproducing speaker apparatus according to claim 7, wherein the lower face of the cabinet is formed by a recessed curved face in which a center portion thereof is more recessed than the both sides in the width direction of the cabinet.

20. The low-frequency sound reproducing speaker apparatus according to claim 19, wherein the recessed curved face of the lower face of the cabinet is constituted by a shape of a trough extended along the front and rear direction of the cabinet and a cavity formed by the recessed curve face between the recessed curve face and the scat cushion is opened in the front and rear direction of the cabinet.

* * * * *